United States Patent
Cao et al.

(10) Patent No.: US 9,752,098 B2
(45) Date of Patent: Sep. 5, 2017

(54) BIO-ASPHALT, BIO-ASPHALT COMPOSITION AND METHOD FOR PREPARING THEM

(71) Applicant: Research Institute of Highway, Ministry of Transportation, Beijing (CN)

(72) Inventors: Dongwei Cao, Beijing (CN); Min He, Beijing (CN); Haiyan Zhang, Beijing (CN); Xiaowei Wu, Beijing (CN); Guoqi Tang, Beijing (CN); Ke Zhong, Beijing (CN); Yongjun Fan, Beijing (CN)

(73) Assignee: Research Institute of Highway, Ministry of Transportation, Beijing (CN)

( * ) Notice: Subject to any disclaimer, the term of this patent is extended or adjusted under 35 U.S.C. 154(b) by 610 days.

(21) Appl. No.: 14/234,598

(22) PCT Filed: May 13, 2013

(86) PCT No.: PCT/CN2013/075536
§ 371 (c)(1),
(2) Date: Jan. 23, 2014

(87) PCT Pub. No.: WO2014/026492
PCT Pub. Date: Feb. 20, 2014

(65) Prior Publication Data
US 2016/0194580 A1  Jul. 7, 2016

(30) Foreign Application Priority Data

Aug. 13, 2012  (CN) .......................... 2012 1 0287249
Aug. 13, 2012  (CN) .......................... 2012 1 0287402

(51) Int. Cl.
| | | |
|---|---|---|
| C08L 95/00 | (2006.01) | |
| C11C 3/00 | (2006.01) | |
| E01C 7/35 | (2006.01) | |
| E01C 7/30 | (2006.01) | |
| C08L 97/02 | (2006.01) | |
| C10C 3/04 | (2006.01) | |
| C10C 1/18 | (2006.01) | |
| C10C 1/19 | (2006.01) | |
| C08L 91/00 | (2006.01) | |

(52) U.S. Cl.
CPC .............. *C11C 3/006* (2013.01); *C08L 91/00* (2013.01); *C08L 95/00* (2013.01); *C08L 97/02* (2013.01); *C10C 1/18* (2013.01); *C10C 1/19* (2013.01); *C10C 3/04* (2013.01); *E01C 7/30* (2013.01); *E01C 7/35* (2013.01); *C08L 2555/30* (2013.01); *C08L 2555/52* (2013.01); *C08L 2555/64* (2013.01)

(58) Field of Classification Search
CPC .......... C08L 95/00; C08L 91/00; C08L 97/02; C08L 2555/30; C08L 2555/52; E01C 7/30; E01C 7/35; C08K 3/34; C10C 5/00; B01D 3/10
See application file for complete search history.

(56) References Cited

U.S. PATENT DOCUMENTS

| | | |
|---|---|---|
| 6,512,090 B1 | 1/2003 | Suchanec et al. |
| 2010/0147190 A1* | 6/2010 | Naidoo ................... C08L 91/00 106/229 |
| 2010/0275817 A1 | 11/2010 | Williams et al. |

FOREIGN PATENT DOCUMENTS

| | | | |
|---|---|---|---|
| CN | 101230288 A | 7/2008 | |
| CN | 102304289 A | 1/2012 | |
| CN | 102485800 A | 6/2012 | |
| CN | 102766340 A | 11/2012 | |
| CN | 102796547 A * | 11/2012 | |
| WO | WO 2011159287 A1 * | 12/2011 | .............. C08L 95/00 |
| WO | 2014144281 A1 | 9/2014 | |

OTHER PUBLICATIONS

CN 102796547 A, Nov. 2012, Machine translation.*
Hill, Daniel R. "Bioasphalt and Biochar from Pyrolysis of Urban Yard Waste (Thesis)", pp. 1-107, Jan. 2012.
Raouf et al., "Determination of Pre-Treatment Procedure Required for Developing Bio-Binders from Bio-Oils", Proc. of the 2009 Mid-Continent Transportation Research Symposium, Ames, IA, pp. 1-14, Aug. 2009.

* cited by examiner

*Primary Examiner* — Satya Sastri
(74) *Attorney, Agent, or Firm* — McCarter & English, LLP; Danielle L. Herritt; Mei Bai

(57) ABSTRACT

The disclosure provides bio-asphalt, bio-asphalt compositions and a method for preparing them. It belongs to the technical field of asphalt material. The method of the disclosure uses bio-oil as the raw material, adopts a combination of extraction process and oxidation process to prepare bio-asphalt, and modifies the product obtained from bio-oil by extraction process or bio-asphalt with ordinary petroleum asphalt and/or aromatic hydrocarbon oil and a macromolecular material to obtain a bio-asphalt composition.

24 Claims, No Drawings

BIO-ASPHALT, BIO-ASPHALT COMPOSITION AND METHOD FOR PREPARING THEM

TECHNICAL FIELD

The disclosure relates to the technical field of road asphalt material, particularly to bio-asphalt and bio-asphalt compositions prepared from bio-oils and a method for preparing them.

BACKGROUND ART

Petroleum asphalt is originated from crude oil processing and refining. The increasingly diminution in resources inevitably leads to scarcer petroleum asphalt. Due to the present excessive exploitation and overuse, petroleum resources are in danger of exhaustion. According to the scientists' prediction, petroleum resources will be exhausted by the middle of the century, namely, around 2050.

The current situation of petroleum resources and the issue of environment development compel us to unremittingly search for and apply novel and renewable alternative materials. At the present, biomass energy, which is researched and developed by the whole world sparing no effort, is a kind of inexhaustible and renewable energy. Thanks to its properties of having widely available raw materials, renewability and biodegradability, this kind of material has taken the pace of industrialization.

There are abundant biomass resources. Take China as an example, there are about 0.7 billion tons of agricultural and sideline products which can be used as energy, wherein the annual output of crop straw is about 0.6 billion tons and the annual output of other agricultural wastes is about 0.13 billion tons; the forest biomass resources which can be used for energy are about 0.3 billion tons each year; and the annual production of municipal solid waste is about 0.25 billion tons. Moreover, compared with fossil energy, biomass energy is environmentally friendly and renewable, which can be regarded as two outstanding advantages.

At present, pyrolysis is the main technical means of bio-energy production and utilization. Biomass pyrolysis, also known as thermal cracking or cracking, usually refers to a process in which biomass is heated in an environment without or lacking oxygen, causing molecular decomposition and thus generating coke, condensable volatile component and gas products, wherein the condensable volatile component is rapidly cooled to flowable liquid and bio-oil or tar in a yield of about 40% to 60% is thereby formed. The crude oil of bio-oil generated through pyrolysis should go through further processing such as classification, purification and separation to obtain gasoline, diesel, methanol, ethanol fuel oil and chemical products.

Usually, the currently produced bio-oil is directly burned as low-level fuel. However, the characteristics of the heavy component of bio-oil are very close to those of asphalt for road, and thus bio-oil can be modified as asphalt for road construction, that is, bio-asphalt, which can not only achieve recycling of relative "wastes" in energy and chemical industry field, turning waste into treasure, but also form a complementary production system of recycling economy.

Bio-asphalt obtained by subjecting bio-oil to extraction process and oxidation process has good adhesion and thus can be used for paving roads. In order to further improve crack resistance at low temperature, the method for improving asphalt performance through modification is commonly used. By adding petroleum asphalt and macromolecular materials to bio-asphalt, bio-asphalt will have considerably enhanced fatigue resistance and significantly reduced temperature sensitivity, and will show good crack resistance at low temperature.

This method for preparing bio-asphalt is characterized in simple process, easy operation and convenient implementation. In addition, bio-oil, the raw material for preparing bio-asphalt is not limited to that rich in lignin, and thus the raw materials for bio-asphalt preparation are more adaptable.

SUMMARY

Problems to be Solved

An object of the disclosure is to provide a method for preparing bio-asphalt from bio-oil, and bio-asphalt and bio-asphalt compositions thereby prepared, so as to solve the problems of the currently widely-used petroleum asphalt, which are increasingly diminishing resources, continuously rising price, unsustainable development and poor performance.

Means for Solving the Problems

The disclosure provides a method for preparing bio-asphalt, characterized in subjecting bio-oil to extraction process and oxidation process and thereby obtaining the bio-asphalt, wherein the bio-oil is an oily liquid product prepared from biomass by pyrolysis and the biomass is preferably biomass rich in lignin, such as wood, straw, bamboo, bark, oak, switchgrass and rice husk, etc. The straw can be corn straw.

The method for preparing bio-asphalt according to the disclosure, wherein the extraction process is a process in which bio-oil is extracted with water and an insoluble bio-oil component is obtained through centrifugal separation.

The method for preparing bio-asphalt according to the disclosure, wherein the oxidation process is an oxidation process in which the insoluble bio-oil component obtained by the extraction process is in contact with air and stirred for 0.5-2 h at 90-120° C.

The method for preparing bio-asphalt according to the disclosure, wherein the oxidation process is an oxidation process in which the insoluble bio-oil component obtained by the extraction process is in contact with air, mixed with an alcohol and stirred for 0.5-2 h at 90-120° C.

The process for preparing bio-asphalt according to the disclosure, wherein the alcohol is ethylene glycol, 1,2-propylene glycol, glycerin, benzyl alcohol or polyethylene glycol, and the content of the alcohol is 5-30 mass % based on the total mass of the insoluble bio-oil compound which is obtained by the extraction process.

The disclosure also provides bio-asphalt, characterized in that the bio-asphalt is obtained by the method for preparing bio-asphalt according to the disclosure, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

The disclosure also provides a bio-asphalt composition, characterized in that the bio-asphalt composition includes: component (A), an insoluble bio-oil component obtained from the bio-oil by the extraction process or the bio-asphalt according to the disclosure; component (B), petroleum asphalt or aromatic hydrocarbon oil or a combination thereof; and component (C), a macromolecular material, wherein the content of the component (A) is 30-60 mass %, preferably 35-55 mass %, the content of the component (B) is 40-70 mass %, preferably 50-60 mass %, and the content of the component (C) is 0-10 mass %, preferably 5-10 mass %, based on the total mass of the bio-asphalt composition.

The bio-asphalt composition according to the disclosure, wherein the bio-asphalt composition has penetration at 25° C. of 40-150 dmm, a softening point of 45-90° C., ductility at 10° C. of 10-80 cm and adhesion to stone of level 5.

The bio-asphalt composition according to the disclosure, wherein the macromolecular material is rubber, resin, thermoplastic elastomer or a combination thereof.

Effects

First of all, the cost of production of asphalt can be reduced by replacing petroleum asphalt with bio-asphalt. Compared with petroleum asphalt which has problems such as exhausted and non-renewable resources, bio-asphalt is renewable and environmentally friendly in the long run. Those properties are determined by using by-products or waste of agriculture and forestry, such as sawdust, straw, rice husk and the like, as the raw materials.

Secondly, the method of the disclosure can separate the component which is suitable for processing asphalt from bio-oil, and modify this component by oxidation to prepare bio-asphalt, which can totally or partially (30-70%) replace petroleum asphalt for road construction and maintenance, and can reduce cost of production of asphalt by about 15%.

Thirdly, by controlling parameters in the extraction-oxidation process such as oxidation temperature, oxidation time etc., the content of the light component in the bio-asphalt intermediate product can be controlled. Thus it can be guaranteed that the bio-asphalt intermediate product has stable thermochemical properties in the production process to inhibit volatilization of the light component in the process of bio-asphalt production, so as to enhance performance stability and eco-environment protection of asphalt materials.

At present, bio-oil is mainly used as fuel, which not only decreases the product added value thereof, but also easily causes environmental pollution. The disclosure uses bio-oil to prepare bio-asphalt, significantly saving the cost of raw materials.

In addition, the raw materials for the disclosure come from low-price biomass resources and are plentiful, and bio-asphalt prepared from those raw materials can replace petroleum asphalt to reduce the dependence on petroleum resources.

Biomass resources such as by-produces of agriculture and forestry can be efficiently recycled by preparing bio-asphalt.

The disclosure has features of simple preparation, low cost and excellent performance.

DESCRIPTION OF EMBODIMENTS

The disclosure provides bio-asphalt, bio-asphalt compositions and a method for preparing them.

The method for preparing bio-asphalt according to the disclosure is carried out by subjecting bio-oil to extraction process and oxidation process to prepare the bio-asphalt. The bio-oil is an oily liquid product obtained by pyrolysis, wherein biomass is used as the raw material. Preferably used biomass includes wood, straw, bamboo, bark, oak, switchgrass and rice husk which belong to by-products of agriculture and forestry, and municipal domestic waste. The straw can be corn straw.

The extraction process and oxidation process according to the disclosure includes steps of washing bio-oil with water, allowing an insoluble bio-oil component obtained through centrifugal separation to come in direct contact with air and constantly stirring the component for 0.5-2 h at 90-120° C., wherein the temperature condition is preferably 95-110° C., more preferably 100-105° C., and the stirring time is preferably 0.5-1.5 h, more preferably 0.5-1 h.

The oxidation process according to the disclosure further includes steps of contacting the insoluble bio-oil component obtained by the extraction process with air, mixing the component with an alcohol and stirring for 0.5-2 h at 90-120° C., wherein the temperature condition is preferably 95-105° C., more preferably 95-100° C.; the stirring time is preferably 0.5-1.5 h, more preferably 0.5-1 h; the alcohol is ethylene glycol, 1,2-propylene glycol, glycerin, benzyl alcohol or polyethylene glycol, and the content of the alcohol is 5-30 mass % based on the total mass of the insoluble bio-oil component which is obtained by the extraction process; and the step of mixing and stirring can be performed before, after or simultaneously with the step of contact with air, more preferably simultaneously.

The bio-asphalt according to the disclosure has penetration at 25° C. of 30-150 dmm, a softening point of 40-80° C., ductility at 25° C. of 10-50 cm or at 15° C. of 0-40 cm and adhesion to stone of level 4-5; methods for measuring the penetration, softening point, ductility and adhesion are respectively performed according to tests T0604-2011, T0606-2011, T0605-2011 and T0616-1993, with reference to the Chinese trade standards JTG E20-2011.

The bio-asphalt composition according to the disclosure is composed of the insoluble bio-oil component obtained from bio-oil by the extraction process or the bio-asphalt, petroleum asphalt and/or aromatic hydrocarbon oil and a macromolecular material in a certain proportion, wherein based on the total mass of the bio-asphalt composition, the content of the insoluble bio-oil component obtained from bio-oil by the extraction process or the bio-asphalt is 30-60 mass %, preferably 35-55 mass %, the content of the petroleum asphalt or aromatic hydrocarbon oil or a combination thereof is 40-70 mass %, preferably 50-60 mass %, and the content of the macromolecular material is 0-10 mass %, preferably 5-10 mass %; the petroleum asphalt is preferably No. 70, No. 90 and No. 110 petroleum asphalt.

The macromolecular material is rubber, resin, thermoplastic elastomer or a combination thereof. The rubber is selected from one or more of natural rubber, neoprene, styrene-butadiene rubber, ethylene propylene diene monomer, butadiene-acrylonitrile rubber, cis-polybutadiene rubber.

The resin is selected from one or more of polyethylene, polystyrene, polypropylene, ethylene-vinyl acetate copolymer. The thermoplastic elastomer is styrene-butadiene-styrene copolymer (SBS).

The macromolecular material can be discarded macromolecular material, the discarded macromolecular material is recycled plastic or waste rubber powder, and the waste rubber powder has a particle size of 30-80 mesh.

The recycled plastic has density of 0.89 g/cm$^3$-0.96 g/cm$^3$, a melting point of 110-135° C. and a melt index at 190° C. with 2.16 Kg ranging from 0.5 g/min to 10 g/min.

The bio-asphalt composition according to the disclosure has penetration at 25° C. of 40-150 dmm, a softening point of 45-90° C., ductility at 10° C. of 10-80 cm, and adhesion to stone of level 5; methods for measuring the penetration, softening point, ductility and adhesion are respectively adopted according to tests T0604-2011, T0606-2011, T0605-2011 and T0616-1993, with reference to the Chinese trade standards JTG E20-2011.

The bio-asphalt composition according to the disclosure can be prepared by subjecting the insoluble bio-oil component obtained from the bio-oil by extraction process or the bio-asphalt according to the disclosure, petroleum asphalt or aromatic hydrocarbon oil or a combination thereof and the macromolecular material to blending process or shearing process or a combination thereof.

Both the bio-asphalt and the bio-asphalt composition according to the disclosure can be used for paving roads.

Embodiments of the disclosure are described below by way of examples. However, the disclosure is not limited to the following specific examples.

EXAMPLES

Raw materials used in each of the examples:

Bio-oil: China Anhui Yineng Bio-energy Co., Ltd.; China Shandong Yineng Bio-energy Co., Ltd., specifications model: YNP2009/3D/Rice.

Petroleum asphalt: China's CNOOC, bio-asphalt No. 70; China's CNOOC, bio-asphalt No. 100.

Aromatic hydrocarbon oil: Shandong Fu Runda Chemical Co., Ltd., saturated component, aromatic component, colloid, asphaltene, which respectively have percentage contents of 25.77%, 65.8%, 8.2% and 0.23%.

SBS: Sinopec Yueyang, trade name: YH-791H, wherein the ratio S/B is 30/70, the density is 0.94 g/cm$^3$, and the melt index (190° C., 2.16 Kg) is 0.5 g/10 min.

SBR: Shandong Gaoshike Industry and Trade Co., Ltd., trade name: 1502.

Glycerol: Xilong Chemical Co., Ltd., analytical reagent.

Ethylene glycol: Beijing Chemical Works, analytical reagent.

1,2-propylene glycol: Xilong Chemical Co., Ltd., analytical reagent.

Performance tests of asphalt materials are performed according to the standards issued by China's Ministry of Transport, namely, the Standard Test Methods of Bitumen and Bituminous Mixtures for Highway Engineering (JTG E20-2011).

Examples of Bio-Asphalt

Example 1 (Extraction-Oxidation 1)

Under the condition of high-speed agitation, 500 g bio-oil was added dropwise to a beaker containing 2000 mL distilled water, which is immersed in ice-water bath (5° C.). After all the bio-oil was added dropwise to beaker, the emulsion was stirred for half an hour and then dehydrated with a centrifugal dehydrator. The obtained insoluble bio-oil component was in direct contact with air and stirred constantly for 1 h at 90° C. to obtain bio-asphalt 1.

Example 2 (Extraction-Oxidation 2)

The insoluble bio-oil component of Example 1 was in direct contact with air and stirred constantly for 90 min at 90° C. to obtain bio-asphalt 2.

Example 3 (Extraction-Oxidation 3)

The insoluble bio-oil component of Example 1 was in direct contact with air and stirred constantly for 45 min at 90° C. to obtain bio-asphalt 3.

Example 4 (Extraction-Oxidation 4)

The insoluble bio-oil component of Example 1 was in direct contact with air and stirred constantly for 1 h at 100° C. to obtain bio-asphalt 4.

Example 5 (Extraction-Oxidation 5)

The insoluble bio-oil component of Example 1 was in direct contact with air and stirred constantly for 90 min at 100° C. to obtain bio-asphalt 5.

Example 6 (Extraction-Oxidation 6)

The insoluble bio-oil component of Example 1 was in direct contact with air and stirred constantly for 45 min at 100° C. to obtain bio-asphalt 6.

Example 7 (Extraction-Oxidation 7)

The insoluble bio-oil component of Example 1 was in direct contact with air and stirred constantly for 45 min at 110° C. to obtain bio-asphalt 7.

Example 8 (Extraction-Oxidation 8)

The insoluble bio-oil component of Example 1 was in direct contact with air and stirred constantly for 30 min at 110° C. to obtain bio-asphalt 8.

Example 9 (Extraction-Oxidation 9)

300 g of the insoluble bio-oil component of Example 1 was in contact with air and stirred constantly in a mixture with 30 g of glycerol for 35 min at 95° C. to obtain bio-asphalt 9.

Example 10 (Extraction-Oxidation 10)

300 g of the insoluble bio-oil component of Example 1 was in contact with air and stirred constantly in a mixture with 60 g of glycerol for 65 min at 95° C. to obtain bio-asphalt 10.

Example 11 (Extraction-Oxidation 11)

300 g of the insoluble bio-oil component of Example 1 was in contact with air and stirred constantly in a mixture with 90 g of glycerol for 70 min at 95° C. to obtain bio-asphalt 11.

Example 12 (Extraction-Oxidation 12)

300 g of the insoluble bio-oil component of Example 1 was in contact with air and stirred constantly in a mixture with 30 g of ethylene glycol for 80 min at 95° C. to obtain bio-asphalt 12.

Example 13 (Extraction-Oxidation 13)

300 g of the insoluble bio-oil component of Example 1 was in contact with air and stirred constantly in a mixture with 60 g of 1,2-propylene glycol for 60 min at 95° C. to obtain bio-asphalt 13.

Examples of Bio-Asphalt Composition

Example 14 (3 Parts of Bio-Asphalt+7 Parts of Petroleum Asphalt)

300 g of bio-asphalt 2 and 700 g of petroleum asphalt No. 70 were stirred under the condition of heating at 130° C. for 10 min to obtain the product, bio-asphalt composition 1.

Example 15 (6 Parts of Bio-Asphalt+4 Parts of Petroleum Asphalt)

600 g of bio-asphalt 3 and 400 g of petroleum asphalt No. 70 were stirred under the condition of heating at 130° C. for 10 min to obtain the product, bio-asphalt composition 2.

Example 16 (Insoluble Bio-Oil Component+SBS+Aromatic Hydrocarbon Oil)

30 g of SBS was added to 300 g of aromatic hydrocarbon oil and stirred for 1 h at 130° C. Then, 200 g of the insoluble bio-oil component obtained by Example 1 was added to the mixture. The resultant mixture is stirred for 45 min at 120° C. to obtain the product, bio-asphalt composition 3.

Example 17 (Insoluble Bio-Oil Component+SBS+Aromatic Hydrocarbon Oil)

30 g of SBS was added to 300 g of aromatic hydrocarbon oil and stirred for 1 h at 130° C. Then, 200 g of the insoluble bio-oil component obtained in Example 1 was added to the mixture. The resultant mixture is stirred for 90 min at 120° C. to obtain the product, bio-asphalt composition 4.

Example 18 (Insoluble Bio-Oil Component+SBR+Petroleum Asphalt)

300 g of petroleum asphalt No. 110 was heated to 130° C., and then 30 g of SBR was added to it. The mixture was stirred at 140° C. for 30 min, and then transferred to a high speed shearing machine to be sheared, wherein the shear temperature is 180° C. and the shear rate is 5000 r/min. After that, 300 g of the insoluble bio-oil component obtained in Example 1 was added to the resultant mixture, which was subsequently stirred at 120° C. for 50 min to obtain the product, bio-asphalt composition 5.

Example 19 (Insoluble Bio-Oil Component+SBR+Petroleum Asphalt)

300 g of petroleum asphalt No. 110 was heated to 130° C., and then 30 g of SBR was added to it. The mixture was stirred at 140° C. for 30 min, and then transferred to a high speed shearing machine to be sheared, wherein the shear temperature is 180° C. and the shear rate is 5000 r/min. After that, 300 g of the insoluble bio-oil component obtained in Example 1 was added to the resultant mixture, which was subsequently stirred at 120° C. for 80 min to obtain the product, bio-asphalt composition 6.

Example 20 (Insoluble Bio-Oil Component+SBR+Petroleum Asphalt)

300 g of petroleum asphalt No. 110 was heated to 130° C., and then 30 g of SBR was added to it. The mixture was stirred at 140° C. for 30 min, and then transferred to a high speed shearing machine to be sheared, wherein the shear temperature is 180° C. and the shear rate is 5000 r/min. After that, 300 g of the insoluble bio-oil component obtained in Example 1 was added to the resultant mixture, which was subsequently stirred at 120° C. for 140 min to obtain the product, bio-asphalt composition 7.

Performance Tests

Tests on bio-asphalt 1-13 (Examples 1-13) and bio-asphalt composition 1-7 (Examples 14-20) in the above examples regarding softening point, penetration at 25° C., ductility (25° C./15° C./10° C.) and adhesion between asphalt and stone were performed. See the test results in Table 1.

The method for the above tests is performed according to the standards issued by China's Ministry of Transport, namely, the Standard Test Methods of Bitumen and Bituminous Mixtures for Highway Engineering (JTG E20-2011).

As seen from the test results in Table 1, the bio-asphalt and bio-asphalt composition of the disclosure can be used for heavy traffic road construction.

TABLE 1

Table 1 Performance Indices of Bio-asphalt

| Asphalt products | Penetration at 25° C. (dmm) | Softening point (° C.) | Ductility (cm) | Adhesion |
|---|---|---|---|---|
| Example 1 | 53 | 45.5 | — | Level 4 |
| Example 2 | 48 | 52 | — | Level 4 |
| Example 3 | 55 | 42.3 | 40.7 (25° C.) | Level 5 |
| Example 4 | 48 | 51.7 | 29.5 (25° C.) | Level 4 |
| Example 5 | 46 | 54 | 26.5 (25° C.) | Level 5 |
| Example 6 | 50 | 48.7 | 34.0 (25° C.) | Level 4 |
| Example 7 | 49 | 52 | 28.4 (25° C.) | Level 4 |
| Example 8 | 51 | 50.1 | 31.2 (25° C.) | Level 4 |
| Example 9 | 98.6 | 49 | 19.8 (15° C.) | Level 5 |
| Example 10 | 45.4 | 54.6 | 1.2 (15° C.) | Level 5 |
| Example 11 | 123 | 47.4 | 23.8 (15° C.) | Level 5 |
| Example 12 | 120.4 | 48.6 | 22.2 (15° C.) | Level 5 |
| Example 13 | 95.2 | 49.6 | 25.5 (15° C.) | Level 5 |
| Example 14 | 45 | 60.5 | 33.7 (10° C.) | Level 5 |
| Example 15 | 47.2 | 54 | 45 (10° C.) | Level 5 |
| Example 16 | 120 | 61.1 | 57.3 (10° C.) | Level 5 |
| Example 17 | 96 | 73.5 | 35.8 (10° C.) | Level 5 |
| Example 18 | 100.9 | 48.8 | 29.2 (10° C.) | Level 5 |
| Example 19 | 83.3 | 51.3 | 24.6 (10° C.) | Level 5 |
| Example 20 | 76.3 | 55.1 | 18.6 (10° C.) | Level 5 |

The invention claimed is:

1. A method for preparing bio-asphalt, characterized in subjecting bio-oil to an extraction process and an oxidation process and thereby obtaining the bio-asphalt, wherein the bio-oil is an oily liquid product prepared from a biomass by pyrolysis, wherein the biomass is selected from the group consisting of wood, straw, bamboo, bark, oak, switchgrass and rice husk, and wherein the bio-asphalt has penetration at 25° C. of 30-150 dmm, a softening point of 40-80° C., ductility at 25° C. of 10-50 cm or at 15° C. of 0-40 cm and adhesion to stone of level 4-5.

2. The method for preparing bio-asphalt according to claim 1, wherein the biomass is selected from the group consisting of corn straw, oak, switchgrass and rice husk.

3. The method for preparing bio-asphalt according to claim 1, wherein the extraction process is a process in which bio-oil is extracted with water and an insoluble bio-oil component is obtained through centrifugal separation.

4. The method for preparing bio-asphalt according to claim 1, wherein the oxidation process is an oxidation process in which the insoluble bio-oil component obtained by the extraction process is in contact with air and stirred for 0.5-2 h at 90-120° C.

5. The method for preparing bio-asphalt according to claim 1, wherein the oxidation process is an oxidation process in which the insoluble bio-oil component obtained by the extraction process is in contact with air, mixed with an alcohol and stirred for 0.5-2 h at 90-120° C.

6. The method for preparing bio-asphalt according to claim 5, wherein the alcohol is ethylene glycol, 1,2-propylene glycol, glycerin, benzyl alcohol or polyethylene glycol, and the content of the alcohol is 5-30 mass % based on the total mass of the insoluble bio-oil component which is obtained by the extraction process.

7. A bio-asphalt, characterized in that the bio-asphalt is obtained by the method for preparing bio-asphalt according to claim 1, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

8. A bio-asphalt composition, characterized in that the bio-asphalt composition includes: component (A), the bio-asphalt obtained by the method for preparing bio-asphalt according to claim 3; component (B), petroleum asphalt or aromatic hydrocarbon oil or a combination thereof; and component (C), a macromolecular material, wherein the content of the component (A) is 30-60 mass %, the content of the component (B) is 40-70 mass %, and the content of the component (C) is 0-10 mass % based on the total mass of the bio-asphalt composition, wherein the bio-asphalt has penetration at 25° C. of 30-150 dmm, a softening point of 40-80° C., ductility at 25° C. of 10-50 cm or at 15° C. of 0-40 cm and adhesion to stone of level 4-5.

9. The bio-asphalt composition according to claim 8, wherein the bio-asphalt composition has penetration at 25° C. of 40-150 dmm, a softening point of 45-90° C., ductility at 10° C. of 10-80 cm and adhesion to stone of level 5.

10. The bio-asphalt composition according to claim 8, wherein the macromolecular material is rubber, resin, thermoplastic elastomer or a combination thereof.

11. The bio-asphalt composition according to claim 9, wherein the macromolecular material is rubber, resin, thermoplastic elastomer or a combination thereof.

12. A bio-asphalt, characterized in that the bio-asphalt is obtained by the method for preparing bio-asphalt according to claim 2, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

13. A bio-asphalt, characterized in that the bio-asphalt is obtained by the method for preparing bio-asphalt according to claim 3, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

14. A bio-asphalt, characterized in that the bio-asphalt is obtained by the method for preparing bio-asphalt according to claim 4, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

15. A bio-asphalt, characterized in that the bio-asphalt is obtained by the method for preparing bio-asphalt according to claim 5, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

16. A bio-asphalt, characterized in that the bio-asphalt is obtained by the method for preparing bio-asphalt according to claim 6, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

17. The method for preparing bio-asphalt according to claim 2, wherein the extraction process is a process in which bio-oil is extracted with water and an insoluble bio-oil component is obtained through centrifugal separation.

18. A bio-asphalt, characterized in that the bio-asphalt is obtained by the method for preparing bio-asphalt according to claim 17, and the bio-asphalt has penetration at 25° C. of 30-150 dmm, a softening point of 40-80° C., ductility at 25° C. of 10-50 cm or at 15° C. of 0-40 cm and adhesion to stone of level 4-5.

19. A bio-asphalt composition, characterized in that the bio-asphalt composition includes: component (A), the bio-asphalt according to claim 7; component (B), petroleum asphalt or aromatic hydrocarbon oil or a combination thereof; and component (C), a macromolecular material, wherein the content of the component (A) is 30-60 mass %, the content of the component (B) is 40-70 mass %, and the content of the component (C) is 0-10 mass % based on the total mass of the bio-asphalt composition.

20. The bio-asphalt composition according to claim 19, wherein the bio-asphalt composition has penetration at 25° C. of 40-150 dmm, a softening point of 45-90° C., ductility at 10° C. of 10-80 cm and adhesion to stone of level 5.

21. The bio-asphalt composition according to claim 19, wherein the macromolecular material is rubber, resin, thermoplastic elastomer or a combination thereof.

22. The bio-asphalt composition according to claim 20, wherein the macromolecular material is rubber, resin, thermoplastic elastomer or a combination thereof.

23. The bio-asphalt composition according to claim 8, wherein the content of the component (A) is 35-55 mass %, the content of the component (B) is 50-60 mass %, and the content of the component (C) is 5-10 mass % based on the total mass of the bio-asphalt composition.

24. The bio-asphalt composition according to claim 19, wherein the content of the component (A) is 35-55 mass %, the content of the component (B) is 50-60 mass %, and the content of the component (C) is 5-10 mass % based on the total mass of the bio-asphalt composition.

* * * * *